S. M. Henlon,
Suspender.
No. 3395. Reissued April 20 1869
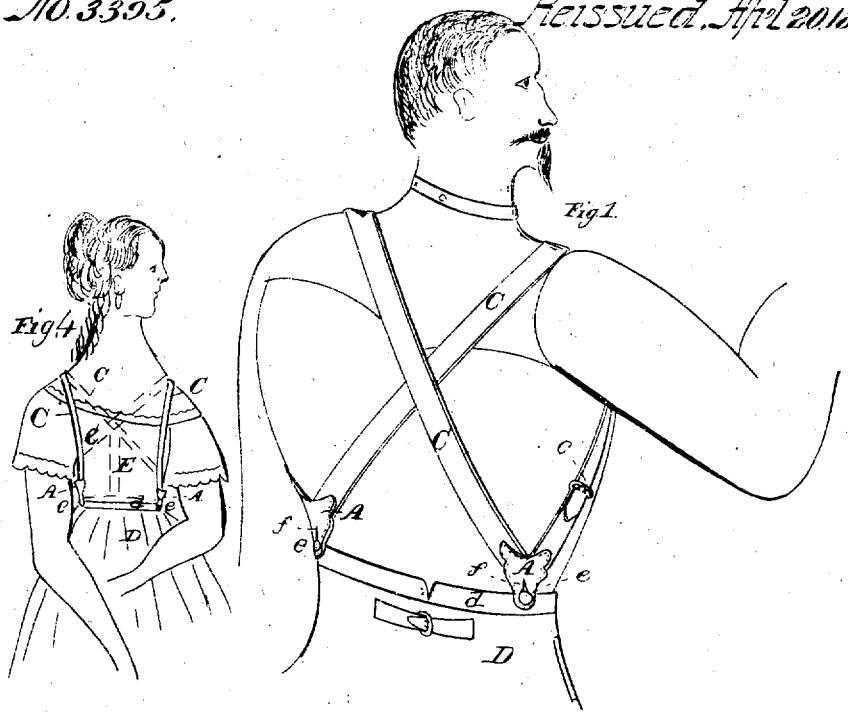
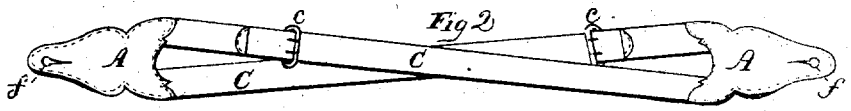
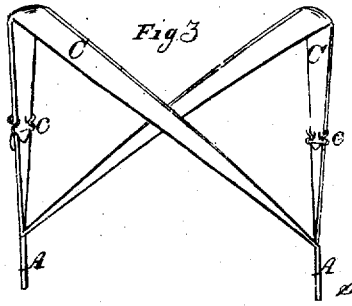
Witnesses:
P. Durand
Jacob Henry
Inventor
Samuel Warren Henlon
By Wiedersheim & Co
Attorneys

UNITED STATES PATENT OFFICE.

SAMUEL W. HENLON, OF SELMA, ALABAMA.

IMPROVEMENT IN SUSPENDERS.

Specification forming part of Letters Patent No. 84,669, dated December 1, 1868; antedated June 1, 1868; Reissue No. 3,395, dated April 20, 1869.

*To all whom it may concern:*

Be it known that I, SAMUEL WARREN HENLON, of Selma, Dallas county, Alabama, have invented certain new and useful Improvements in Suspenders; and I do hereby declare that the following is a full, clear, and exact description of the same, reference being had to the annexed drawings, and to the letters of reference marked thereon, making part of the same, in which—

Figure 1 is a side perspective view, showing my said invention. Fig. 2 represents a pair of suspenders laid out flat. Fig. 3 is a rear perspective view, and illustrates how the suspenders are applied and worn. Fig. 4 shows how the suspender is applied and worn when intended for ladies' use.

The object of my invention is to so combine shoulder-braces and suspenders by a simple and practical arrangement that, while the pantaloons or other articles of dress are securely supported, the same is done in such a manner as to throw the body forward and cause it to occupy a perpendicular position. Another great advantage possessed by my invention is this, the shoulder-straps not only pass in the rear of the lungs, but at the same time are united together at a point in such a manner as to form a fork, said fork being sufficiently far beneath the arm-pit to render it impossible for the straps to be brought in such close contact with the cavity or under portion of the arm as to impede in any degree, no matter how slight, the freest circulation and respiration.

It will be observed that my invention relieves the breast and hips entirely from pressure and causes the same to rest solely upon and be borne by the upper portion of the shoulder-blades. The point at which I attach the suspenders to the pantaloons or other article of dress is above the hips and in a line which extends from the center of the hollow under the shoulder to the foot. The shoulder-straps intersect a short distance below the neck and near the shoulder-blades.

To obtain the result accomplished by my invention has long been considered a great desideratum, and many attempts have been made to secure the same, but they have all proved unsuccessful. The devices have either been so complicated as to render them entirely impracticable, or else constructed with bands passing across midway either the breast or back in such manner that circulation is materially interfered with, defeating in the most important feature the object sought after and accomplished by my invention—*i. e.*, securing to the lungs entire freedom from pressure.

To enable others skilled in the art to make and use my invention, I will proceed to describe its construction and operation.

A A are attaching-straps or pieces of leather, or other suitable material of lozenge, diamond, or other convenient forms. To these are secured in any convenient or suitable manner straps C C, one strap C being secured to the corresponding corners of the attaching straps or pieces A, so that when laid down flat the straps C c as each other, as seen in Fig. 2. These straps C C are constructed of elastic webbing or other suitable material.

To the straps C C, I apply buckles *c c* or other devices by means of which I am enabled to lengthen or shorten the straps C C as occasion requires.

To the band *d* of the pantaloons D, or other article of dress that it is desired to support, I attach buttons *e e* or other suitable fastenings. These buttons *e e* are secured to the band *d* at such points that when the pantaloons or skirts D are adjusted to the form of the wearer the buttons *e e* will be above the hips.

To the buttons *e e*, I attach my combined shoulder-brace and suspender, the pieces A having botton-holes *f f* or other fastenings.

The connecting of the shoulder-straps together by "brace-straps" is objectionable, for it matters not whether they pass across the breast or back, they of necessity interfere with the circulation, and whenever they pass over the lungs, causing pressure, they impede the respiration in a degree nearly as great as does the old style of suspenders, which experience has demonstrated that persons threatened with consumption or other lung involvement should not wear; and, again, it will be observed that my device leaves the cavity under the arm free from pressure. In other contrivances of a character similar to my invention the shoulder-straps form a loop under the arm-pit, which is most objectionable.

To the shoulder-straps C C, where they cross when in use, I apply a loop to hold the straps together. When applied for ladies' use the strap *e* is suspended from this loop and the device is applied in the following manner:

To the strap *d* of the hoop or outer skirt, D, I attach three buttons, two in the manner before described and one in the rear. To the under skirt I attach suitable loops, which pass over these buttons, and my invention is then applied.

Having thus described my invention, what I claim as new, and desire to secure by Letters Patent, is—

1. A suspender for garments, made of straps that diverge from the buttoning-loops at each side, so as to pass up and over the shoulder and across the back, substantially as set forth.

2. A suspender for garments, made of straps that diverge from the buttoning-loops to pass up and over the shoulder and across the back to the opposite point of attachment near the hips, in combination with a loop applied at the point of intersection of the straps at the back, substantially as specified.

3. A suspender formed of two straps, each of which diverges from the point of attachment near the hips on the one side, so as to pass toward the back and over the shoulder to the point of attachment on the other side, and provided with an adjustment applied to the front straps, substantially as specified.

In witness whereof I have hereunto set my signature this 18th day of December, A D. 1868.

SAM. W. HENLON.

Witnesses:
WM. E. WAILES,
J. C. BENEW.